US012764372B2

(12) United States Patent
Takamine et al.

(10) Patent No.: US 12,764,372 B2
(45) Date of Patent: Oct. 13, 2026

(54) INFORMATION PROCESSING METHOD, DISPLAY DEVICE, AND RECORDING MEDIUM STORING PROGRAM

(71) Applicant: SEIKO EPSON CORPORATION, Tokyo (JP)

(72) Inventors: Yusaku Takamine, Azumino (JP); Kosuke Tabayashi, Azumino (JP)

(73) Assignee: SEIKO EPSON CORPORATION, Tokyo (JP)

( * ) Notice: Subject to any disclaimer, the term of this patent is extended or adjusted under 35 U.S.C. 154(b) by 57 days.

(21) Appl. No.: 18/888,600

(22) Filed: Sep. 18, 2024

(65) Prior Publication Data

US 2025/0097502 A1 Mar. 20, 2025

(30) Foreign Application Priority Data

Sep. 19, 2023 (JP) ................................ 2023-150835

(51) Int. Cl.
*H04N 21/41* (2011.01)
*H04N 21/438* (2011.01)

(52) U.S. Cl.
CPC ....... *H04N 21/4104* (2013.01); *H04N 21/438* (2013.01)

(58) Field of Classification Search
None
See application file for complete search history.

(56) References Cited

U.S. PATENT DOCUMENTS

2008/0243940 A1 10/2008 Kato
2011/0314497 A1* 12/2011 Warrick ............ H04N 21/4524 725/38
2012/0209961 A1* 8/2012 McCoy .................. H04L 65/60 709/219
2014/0359646 A1* 12/2014 Warrick ............ H04N 21/2143 725/5
2017/0052750 A1* 2/2017 Koizumi ................ A63F 13/98
2019/0342630 A1* 11/2019 Li .......................... H04L 67/55
2022/0075251 A1 3/2022 Takamine et al.

FOREIGN PATENT DOCUMENTS

JP 2008-250574 A 10/2008
JP 2013-140601 A 7/2013
JP 2022-046123 A 3/2022

* cited by examiner

*Primary Examiner* — Junior O Mendoza
(74) *Attorney, Agent, or Firm* — Oliff PLC

(57) ABSTRACT

A processing device of a projector performs control for correlating user information used by the application software with a projector. The processing device operates in a first mode including performing control for cancelling the correlation between the user information and the projector when the projector is powered off and maintaining the correlation between the user information and the projector when the projector shifts to the standby state.

9 Claims, 8 Drawing Sheets

INFORMATION PROCESSING METHOD, DISPLAY DEVICE, AND RECORDING MEDIUM STORING PROGRAM

The present application is based on, and claims priority from JP Application Serial Number 2023-150835, filed Sep. 19, 2023, the disclosure of which is hereby incorporated by reference herein in its entirety.

BACKGROUND

1. Technical Field

The present disclosure relates to an information processing method, a display device, and a recording medium storing a program.

2. Related Art

There has been known a technique for deleting information used in an information processing device when the information processing device is powered off. For example, JP-A-2008-250574 discloses a data management system that deletes data stored in an information processing device by a user and also deletes data stored in a device outside the information processing device to prevent information leakage.

JP-A-2008-250574 is an example of the related art.

In JP-A-2008-250574, the data is deleted when the information processing device is powered off. In order to maintain the data in the information processing device, it is necessary to keep the information processing device on. Convenience is not necessarily high.

SUMMARY

According to an aspect of the present disclosure, there is provided an information processing method including: performing control for correlating user information used by application software with a display device that executes the application software; and operating in a first mode including: performing control for cancelling the correlation between the user information and the display device when the display device is powered off; and maintaining the correlation between the user information and the display device when the display device shifts to a standby state.

According to an aspect of the present disclosure, there is provided a display device including an optical device and a processing device, the processing device executing: executing application software; performing control for correlating user information used by the application software with the display device; and operating in a first mode including: performing control for cancelling the correlation between the user information and the display device when the display device is powered off; and maintaining the correlation between the user information and the display device when the display device shifts to a standby state.

According to an aspect of the present disclosure, there is provided a recording medium storing a program, the program causing a processing device to execute: performing control for correlating user information used by application software with a display device that executes the application software; and operating in a first mode including: performing control for cancelling the correlation between the user information and the display device when the display device is powered off; and maintaining the correlation between the user information and the display device when the display device shifts to a standby state.

DESCRIPTION OF EMBODIMENTS

Figure 1:
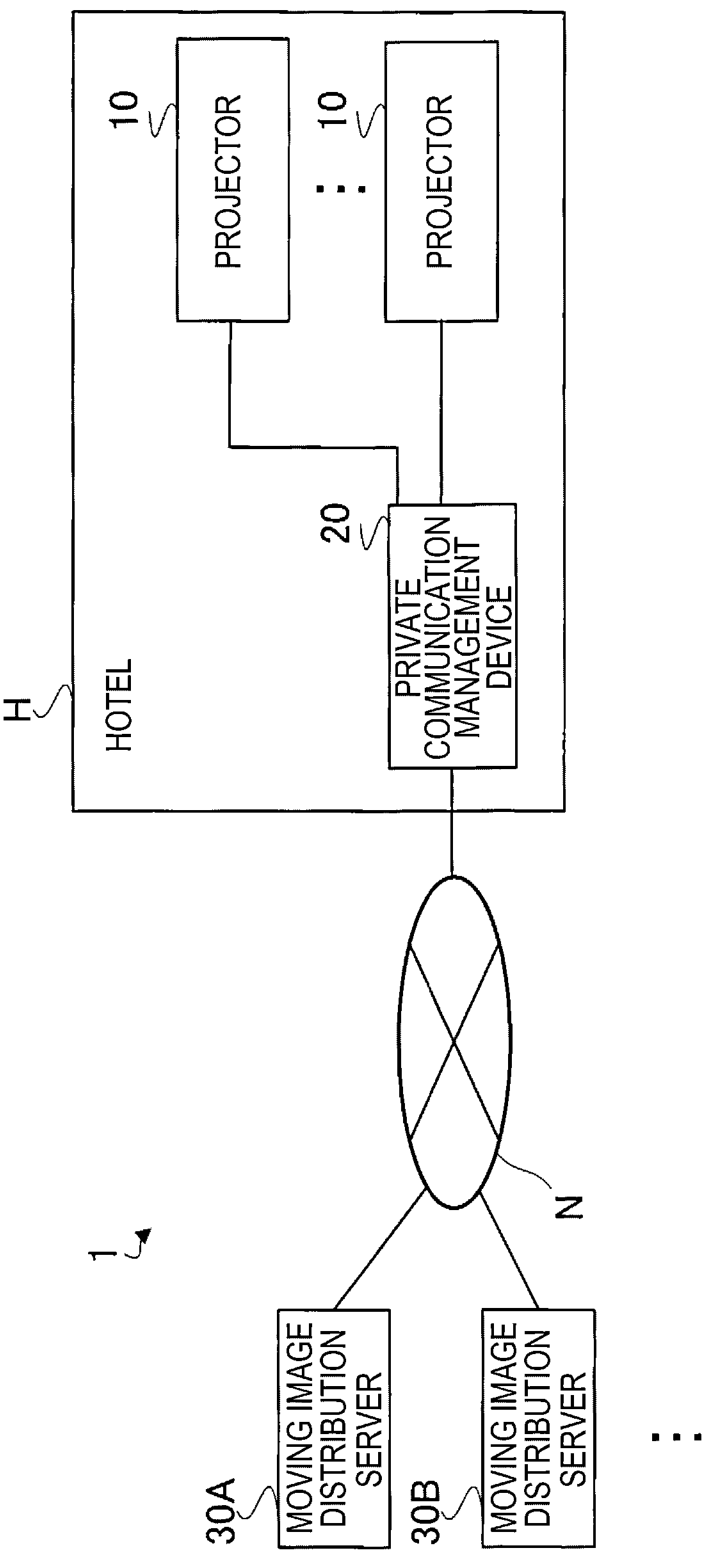
FIG. 1 is a diagram illustrating a display system according to a first embodiment.

Preferred embodiments according to the present disclosure are explained below with reference to the accompanying drawings. In the drawings, dimensions and scales of parts are different from the actual ones as appropriate and some portions are schematically illustrated in order to facilitate understanding. The scope of the present disclosure is not limited to these embodiments unless it is particularly described to limit the present disclosure in the following explanation.

A: First Embodiment

A-1: Overview of a Display System 1

FIG. 1 is a diagram illustrating a display system 1 according to a first embodiment. The display system 1 includes a projector 10, a private communication management device 20, and moving image distribution servers 30A and 30B.

The projector 10 displays an image by projecting the image onto a screen such as a wall, a ceiling, or cloth. The projector 10 is an example of a display device. In the present embodiment, the projector 10 is installed in a hotel H. More specifically, the projector 10 is disposed in each of a plurality of guest rooms of the hotel H. Thus, the display system 1 includes a plurality of projectors 10. A guest of the hotel H can, using the projector 10 in a guest room in which the guest stays, view, for example, a floor guide of the hotel H or use a moving image distribution service. In the following explanation, a person using the projector 10 is referred to as user. In the present embodiment, the user is a guest of the hotel H.

The number of projectors 10 of the display system 1 may be one. For example, one projector 10 provided in a lounge of the hotel H may be the projector 10 of the display system 1.

The private communication management device 20 connects an information processing device present in the hotel H to a network N. The private communication management device 20 includes, for example, a modem or an optical network unit (ONU), a router, and a hub. In FIG. 1, the projector 10 is coupled to the private communication management device 20. However, a smartphone or a personal computer owned by the user may be coupled to the private communication management device 20. The private communication management device 20 and the projector 10 may be coupled by wire or may be coupled by radio.

The moving image distribution servers 30A and 30B distribute moving images to a subscriber of a moving image distribution service on demand. The moving image distribution server 30A is a server of a moving image distribution service A. The moving image distribution server 30B is a server of a moving image distribution service B. In the present embodiment, an operator of the hotel H subscribes to the moving image distribution service A and the moving image distribution service B. The private communication management device 20 is coupled to the moving image distribution servers 30A and 30B via the network N. While staying in the hotel H, the user can project and appreciate, on the projector 10, moving images distributed by the moving image distribution service A and the moving image distribution service B. When the user subscribes to at least one of the moving image distribution service A and the moving image distribution service B, the user can also input account information of the user to the projector 10 and use the moving image distribution service A or the moving image distribution service B. Besides the moving image distribution service A and the moving image distribution service B, there are many moving image distribution services. Servers are provided to correspond the respective moving image distribution services.

A-2: Configuration of the Projector 10

Figure 2:
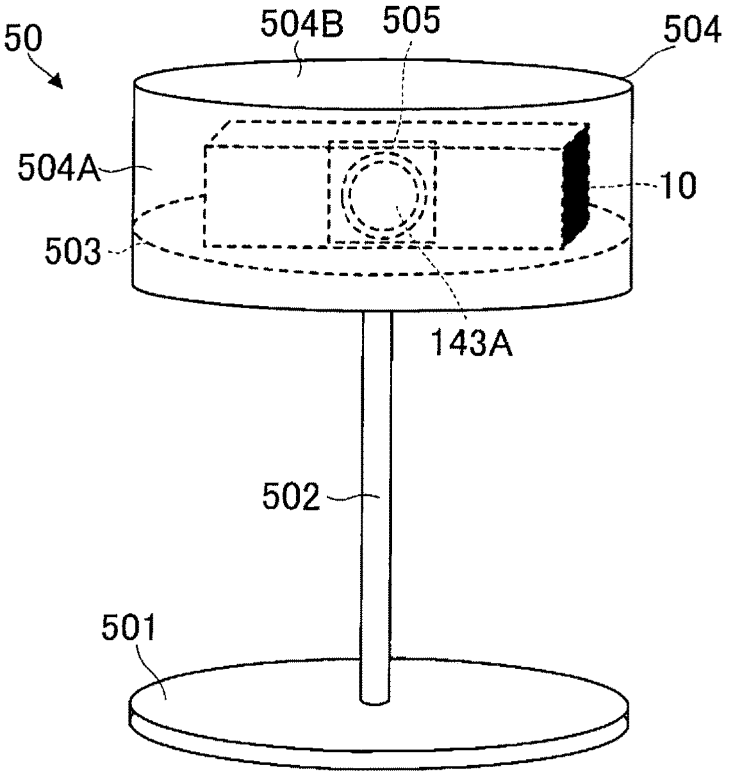
FIG. 2 is a schematic diagram illustrating an exterior of a projector.

FIG. 2 is a schematic diagram illustrating an exterior of the projector 10. In the present embodiment, the projector 10 is housed on the inside of a luminaire 50 to prevent the exterior of the projector 10 from being seen from a customer. In general, a guest room of the Hotel H has unified interior design. On the other hand, the exterior of the projector 10 has a mechanical feeling. When the projector 10 is disposed in the guest room, it is likely that the projector 10 does not go well with the unity of the interior design. In the present embodiment, since the luminaire 50 houses the projector 10, the unit of a guest room space is produced by the exterior of the projector 10.

The luminaire 50 includes a pedestal 501, a post 502, a base 503, and a shade 504. The pedestal 501 is installed on a floor surface of the guest room, a desk, or the like. More specifically, the pedestal 501 is a plate-shaped member having two surfaces. One surface of the pedestal 501 is in contact with an installation surface such as the floor surface and the other surface is coupled to the post 502. The post 502 is a bar-like member vertically erected from the other surface of the pedestal 501. One end of the post 502 is coupled to the pedestal 501. The other end of the post 502 is coupled to the base 503. The base 503 is a plate-shaped member having two surfaces. One surface of the base 503 is coupled to the post 502. The projector 10 is placed on the other surface. A power supply wire of the projector 10 is disposed, for example, on the inside of the post 502.

The shade 504 surrounds the base 503 and the projector 10. The shade 504 includes a side surface shade 504A that surrounds the outer peripheral side of the base 503 and the projector 10, an upper surface shade 504B disposed above the base 503, and a not-illustrated lower surface shade disposed below the base 503. The shade 504 has a cylindrical shape as a whole. The inside of the shade 504 is hollow. A video light transmission region 505 is provided at a position of the side surface shade 504A facing a projection opening 143A of the projector 10. In the present embodiment, the video light transmission region 505 is formed of a translucent mirror. Thus, the video light transmission region 505 reflects light from the outside. However, video light emitted from the projector 10 is transmitted through the video light transmission region 505 and is projected to the outer side of the shade 504. The surface of the side surface shade 504A is formed of a mirror surface that reflects light made incident from the outside. Thus, a boundary between the video light transmission region 505 and other parts is less easily seen from the outside and the presence of the video light transmission region 505 is less easily seen. The projector 10 cannot be seen from the outside and the projection opening 143A cannot be seen.

A not-illustrated first illumination unit is disposed above the projector 10 in the shade 504. The first illumination unit faces the upper surface shade 504B and illuminates the upper surface shade 504B from the lower side. Accordingly, light is diffused and radiated to the upper side from the upper surface shade 504B. A not-illustrated second illumination unit is disposed below the base 503. The second illumination unit faces the lower surface shade and illuminates the lower surface shade from the upper side. Therefore, light is diffused and radiated to the lower side from the lower surface shade. The first illumination unit and the second illumination unit are planar light sources. For example, the first illumination unit and the second illumination unit include arrays of light emitting elements such as LEDs (light emitting diodes) and wires disposed on a substrate. Arrangement regions of the light emitting elements substantially uniformly emit light. The first illumination unit and the second illumination unit are supported by the shade 504 and the post 502.

The exterior and the structure of luminaire 50 illustrated in FIG. 2 are examples. Any exterior and structure may be used if the projector 10 can be housed in the luminaire 50.

A-3: Configuration of the Projector 10

Figure 3:
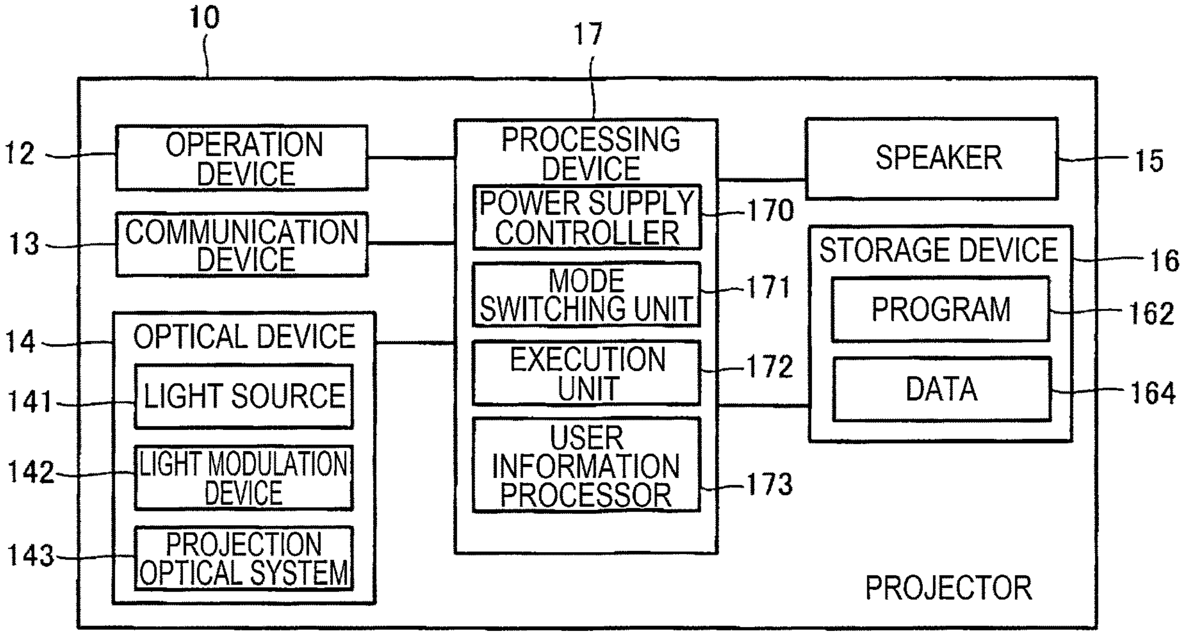
FIG. 3 is a block diagram illustrating a configuration of the projector.

FIG. 3 is a block diagram illustrating a configuration of the projector 10. The projector 10 includes an operation device 12, a communication device 13, an optical device 14, a speaker 15, a storage device 16, and a processing device 17.

The operation device 12 receives input operation from the user. The operation device 12 is, for example, various operation buttons, operation keys, or a touch panel. The operation device 12 is provided, for example, in a housing of the projector 10. The operation device 12 may be a remote controller provided separately from the housing of the projector 10.

The communication device 13 is an interface communicably coupled to the private communication management device 20. The communication device 13 receives image data from an image supply device such as the moving image distribution servers 30A and 30B via the private communication management device 20. The communication device 13 is, for example, an interface such as a wireless or wired LAN (Local Area Network), a Bluetooth, a USB (Universal Serial Bus), or an HDMI (High Definition Multimedia Interface). Bluetooth, USB, and HDMI are respectively registered trademarks. The communication device 13 includes an antenna in the case of radio, includes an interface such as a connector in the case of wire, and includes an interface circuit for electrically processing signals received via the interface.

The optical device 14 projects a projection image onto a screen based on an image signal from the processing device 17. The optical device 14 includes a light source 141, a light modulation device 142, and a projection optical system 143.

The light source 141 includes, for example, a halogen lamp, a xenon lamp, an ultra-high pressure mercury lamp, an LED, and a laser light source. The light source 141 emits, for example, red light, green light, and blue light or emits white light. When the light source 141 emits white light, light emitted from the light source 141 is reduced in variation of a luminance distribution with a not-illustrated integrator optical system and is thereafter separated into red light, green light, and blue light with a not-illustrated color separation optical system and made incident on the light modulation device 142.

The light modulation device 142 includes three light modulation elements respectively provided to correspond to red, green, and blue. Each of the light modulation elements includes, for example, a transmissive liquid crystal panel, a reflective liquid crystal panel, and a DMD (digital mirror device). The light modulation elements respectively modulate the red light, the green light, and the blue light based on an image signal from the processing device 17 to generate image lights of the colors. The image lights of the colors generated by the light modulation device 142 are combined by a not-illustrated color combination optical system and become full color image light. Note that the light modulation device 142 is not limited to this. The full color image light may be visually recognized by emitting the image lights of the colors in a time division manner using a single-plate liquid crystal panel, a DMD, or the like.

The projection optical system 143 forms and projects the full color image light on a screen. The projection optical system 143 is an optical system including at least one projection lens and may include a zoom lens, a focus lens, or the like. The projection opening 143A explained above is a part of the projection optical system 143.

The speaker 15 outputs sound based on sound data. In the present embodiment, the speaker 15 mainly outputs sound based on sound data included in moving image data. The speaker 15 may be provided separately from the other elements of the projector 10. In this case, the speaker 15 and the projector 10 may be coupled to each other via a wired or wireless interface such that data can be transmitted and received.

The storage device 16 is a recording medium readable by the processing device 17. The storage device 16 includes, for example, a nonvolatile memory and a volatile memory. Examples of the nonvolatile memory include a ROM (Read Only Memory), an EPROM (Erasable Programmable Read Only Memory), and an EEPROM (Electrically Erasable Programmable Read Only Memory). Examples of the volatile memory include a RAM.

The storage device 16 stores a control program 162 to be executed by the processing device 17 and various data 164 to be used by the processing device 17. The control program 162 is executed by the processing device 17. The control program 162 includes, for example, an operating system and a plurality of application software programs. The data 164 includes information input from the user when the application software is executed and information generated by the application software when the application software is executed, that is, user information.

The processing device 17 is configured by, for example, a single processor or a plurality of processors. As an example, the processing device 17 is configured by a single CPU (Central processor) or a plurality of CPUs. A part or all of functions of the processing device 17 may be implemented by a circuit such as a digital signal processor (DSP), an application specific integrated circuit (ASIC), a programmable logic device (PLD), or a field programmable gate array (FPGA). The processing device 17 executes various kinds of processing in parallel or sequentially.

The processing device 17 reads the control program 162 from the storage device 16 and executes the control program 162 to thereby function as a power supply controller 170, a mode switching unit 171, an execution unit 172, and a user information processor 173.

A-4. Details of the Processing Device 17

Subsequently, details of the power supply controller 170, the mode switching unit 171, the execution unit 172, and the user information processor 173 implemented by the processing device 17 executing the control program 162 are explained.

The power supply controller 170 controls a power supply state of the projector 10. The power supply state of the projector 10 includes, for example, power-on, power-off, and standby. The power-on is a state in which an entire main board including the processing device 17 is energized and the projector 10 can be used. In the power-on, images illustrated in FIGS. 4 to 7 explained below can be displayed.

The power-off is a state in which an image is not displayed and only operation on the housing of the projector 10 or a power button of a remote controller is received. When the power button is operated at the power-off time, the power controller 170 shifts the projector 10 to the power-on.

In the standby state, an image is not displayed as in the power-off but operation input of other than the power button is also received. When operation input of the power button or other than the power button is performed in the standby state, the power controller 170 shifts the projector 10 to the power-on. In the standby state, application software can be updated. The standby state is a state in which a part of the main board including the processing device 17 is energized.

For example, when the power button is short-pressed when the projector 10 is in the power-on, the power supply controller 170 shifts the projector 10 to the standby state. When the power button is long-pressed when the projector 10 is in the power-on or the standby state, the power supply controller 170 shifts the projector 10 to the power-off. In other words, when first operation is performed on the power button of the projector 10 at the time of the power-on of the projector 10, the projector 10 shifts to the standby state. When second operation more complicated than the first operation is performed on the power button, the projector 10 is powered off. The short-press is an example of the first operation and the long-press is an example of the second operation. As another example, the power supply controller 170 may shift the projector 10 to the standby state when the power button is pressed once at the time of the power-on of the projector 10. The power supply controller 170 may shift the projector 10 to the power-off when the power button is pressed twice at the time of the power-on or the standby state of the projector 10. In this case, the pressing once is an example of the first operation and the pressing twice is an example of the second operation.

Figure 6:
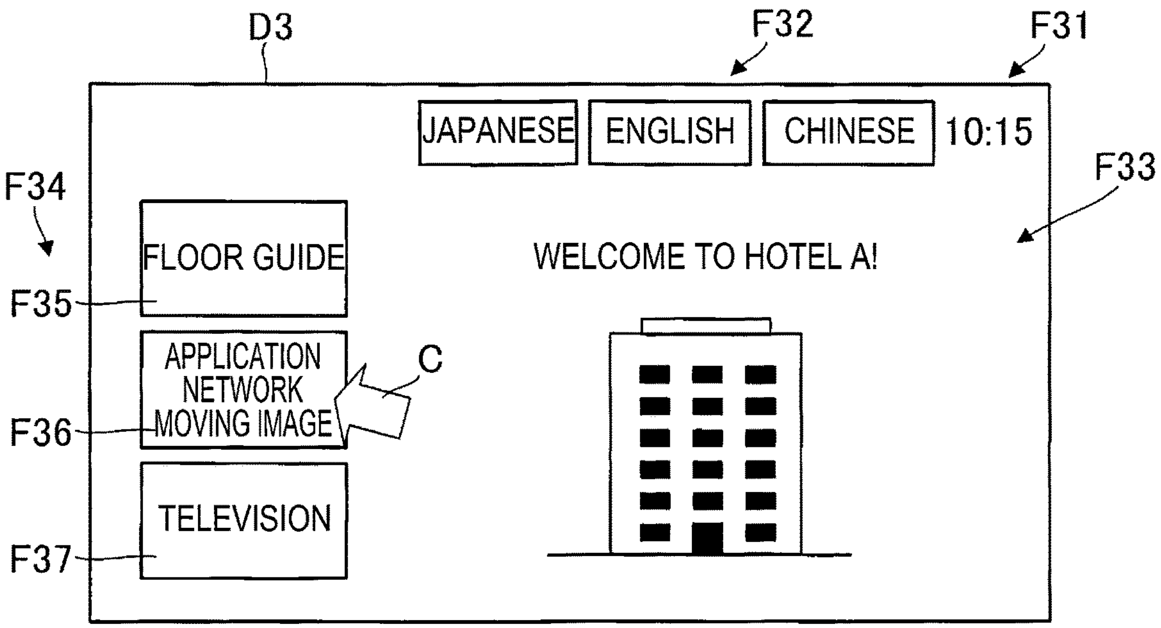
FIG. 6 is a schematic diagram illustrating an initial screen in a hotel mode.

The power supply controller 170 may shift to the standby state, for example, when operation on the projector 10 is not performed and a displayed image does not change for a first period or more. Specifically, for example, after an initial screen D3 illustrated in FIG. 6 is displayed, when a state in which no input is made from the user has lasted for the first period or more, the power supply controller 170 shifts the projector 10 to the standby state. Further, the power supply controller 170 may shift the projector 10 to the power-off state when a second period has elapsed after the projector 10 shifted to the standby state. As an example, the first period may be 10 minutes or 15 minutes and the second period may be 5 minutes or 10 minutes.

The mode switching unit 171 switches an operation mode of the projector 10 between a general mode and a hotel mode. The general mode is an example of a second mode, and the hotel mode is an example of a first mode.

The general mode is an operation mode in which it is assumed that the projector 10 is used at home or the like. In other words, in the general mode, it is assumed that the projector 10 is used by people having a fixed relationship such as family members or friends. As explained in detail below, in the general mode, for example, account information of a moving image distribution service, age setting of a viewer, a viewing history, and the like are maintained as long as there is no instruction of the user. Accordingly, the user can omit input of the account information of the moving image distribution service or refer to the viewing history.

On the other hand, the hotel mode is an operation mode in which it is assumed that the projector 10 is used in the hotel H. In other words, in the hotel mode, it is assumed that the projector 10 is used by an unspecified large number of users. Examples of a facility where it is assumed that the projector 10 is used by an unspecified large number of users include, beside a hotel, facilities where an unspecified large number of people stay such as a hospital, a welfare care facility, and a residence. When the projector 10 is used in these facilities, the name of the hotel mode may be changed as appropriate.

As explained in detail below, in the hotel mode, for example, account information of a moving image distribution service, age setting of a viewer, a viewing history, and the like are maintained in the standby state of the projector 10 but are erased at the power-off time of the projector 10. Accordingly, the user can omit input of the account information of the moving image distribution service or refer to the viewing history during the stay in the hotel H. When the user leaves the hotel H, personal information of the user is erased by powering off the projector 10. Therefore, it is possible to prevent the personal information from being known by others.

The mode switching unit 171 switches the operation mode of the projector 10 based on, for example, operation of an employee of the hotel H. In other words, the mode switching unit 171 receives selection of one operation mode among a plurality of operation modes including the hotel mode and the general mode. In the present embodiment, the employee of the hotel H performs predetermined operation on the projector 10 to thereby switch the projector 10 to an administrator authority mode in which more detailed setting than usual is possible. The administrator authority mode is a mode for performing setting for the projector 10 and is a mode of a type different from the normal mode and the hotel mode that are premised on the use of the projector 10.

The switching to the administrator authority mode is performed, for example, by inputting a special command to an operation button provided in the housing of the projector 10. The special command may be, for example, simultaneously pressing a predetermined plurality of operation buttons such as a power button and a setting button or may be sequentially operating a predetermined plurality of operation buttons such as a setting button, a microphone button, and a home button in order. The special command may be, for example, pressing a predetermined one of the operation buttons of the housing simultaneously with connection of a power supply cable to the housing of the projector 10.

The switching to the administrator authority mode may be performed, for example, by inputting a special command to an operation button provided in a remote controller of the projector 10. In this case, as in the case of the operation button of the housing, the special command may be, for example, simultaneously pressing a predetermined plurality of operation buttons or may be sequentially operating the predetermined plurality of operation buttons. The special command may be, for example, pressing a predetermined one of operation buttons of the remote controller simultaneously with connection of the power cable to the housing of the projector 10.

Figure 4:
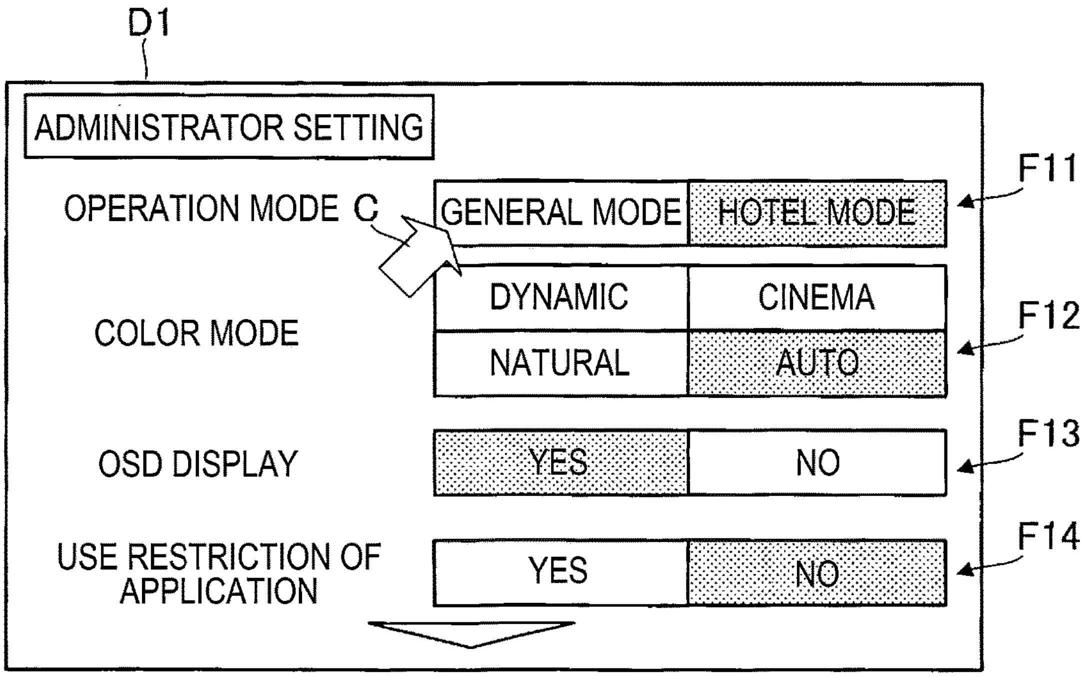
FIG. 4 is a schematic diagram illustrating a setting screen in an administrator authority mode.

FIG. 4 is a schematic diagram illustrating a setting screen D1 in the administrator authority mode. The setting screen D1 illustrated in FIG. 4 is projected on the screen by the projector 10. The setting screen D1 includes a setting interface F11 for the operation mode of the projector 10. The setting interface F11 includes a button indicating the general mode and a button indicating the hotel mode. A button indicating a currently selected mode is displayed in a color different from a color of the other buttons. In FIG. 4, the hotel mode is selected. When desiring to switch the operation mode to the general mode, the employee moves a cursor C to the button indicating the general mode using the operation button of the housing of the projector 10 or the remote controller. Then, when the employee presses a predetermined button of the housing or the remote controller such as a determination button in a state in which the button indicating the general mode and the cursor C overlap, the operation mode of the projector 10 is changed from the hotel mode to the general mode.

The setting screen D1 illustrated in FIG. 4 includes, besides the operation mode setting interface F11, a color mode setting interface F12, an OSD (On-Screen Display) display propriety setting interface F13, and an application use restriction presence/absence setting interface F14. Besides, for example, a maximum sound volume setting interface, a power-on time sound volume setting interface, a power-on time home address setting interface, or the like may be displayed on the setting screen D1.

The execution unit 172 executes application software. More specifically, when the projector 10 operates in the normal mode or the hotel mode, the execution unit 172 executes application software designated by the user. The application software is software that is installed in the projector 10 and implements various functions. Specifically, for example, application software A for viewing a moving image of the moving image distribution service A and application software B for viewing a moving image of the moving image distribution service B are installed in the projector 10. The application software may implement not only the moving image viewing but also, for example, a function of a game or an Internet browser. In the drawings, "application software" is sometimes referred to as "application".

Figure 5:
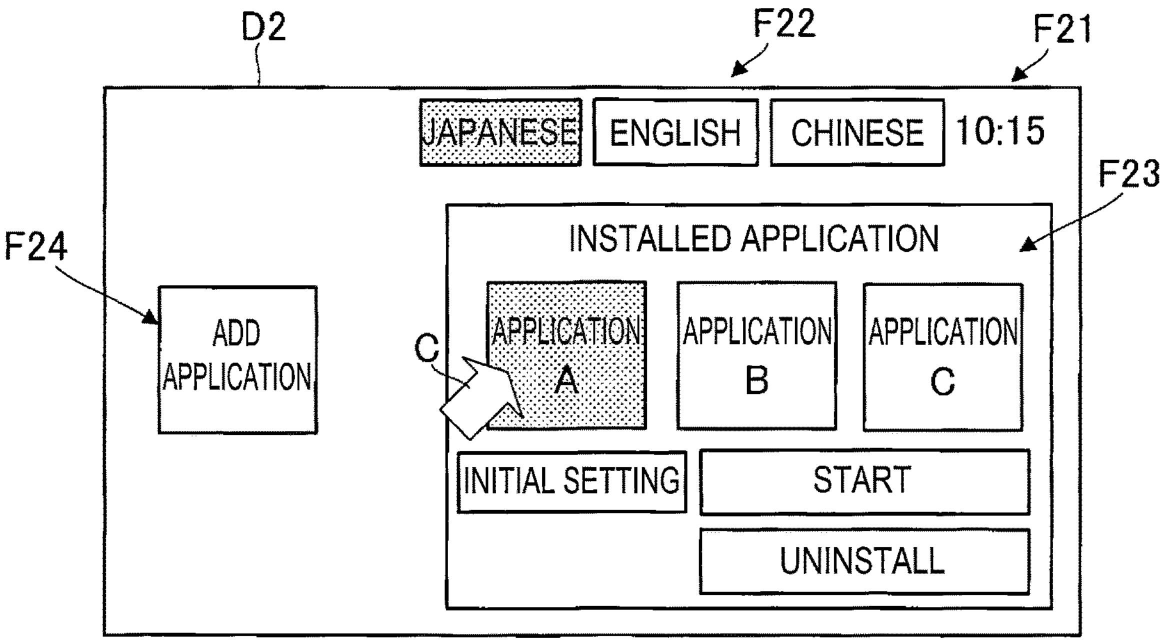
FIG. 5 is a schematic diagram illustrating a selection screen for application software in a general mode.

FIG. 5 is a schematic diagram illustrating a selection screen D2 for application software in the general mode. The selection screen D2 illustrated in FIG. 5 includes a time indication F21, a language setting interface F22, an application software selection interface F23, and an application software addition interface F24.

The time indication F21 displays current time. The language setting interface F22 specifies a language of text information displayed by the projector 10. In an example illustrated in FIG. 4, Japanese, English, and Chinese are selectable and a state in which Japanese is selected among the languages is illustrated.

The application software selection interface F23 is an interface for selecting application software to be executed by the projector 10. In an example illustrated in FIG. 5, the selection interface F23 includes application (application software) buttons indicating names of application software installed in the projector 10 and instruction buttons indicating instructions to the application software. The application buttons include an "application A button", an "application B button", and an "application C button". The instruction buttons include an "initial setting button" for performing initial setting for the application software, a "start button" for starting the application software, and an "uninstall button" for uninstalling the application software from the projector 10. The user moves the cursor C to select a button corresponding to desired application software and thereafter selects an instruction button corresponding to an instruction to the application software. For example, when the user desires to use the application software A, the user selects the "application A button" and then selects the "start button".

The application software addition interface F24 is an interface for installing application software in the projector 10. The addition interface F24 includes an "application addition button". When the user selects the "application addition button", the projector 10 is coupled to the application store via the network N and displays a screen of an application store. The user selects desired application software and installs the application software in the projector 10.

As explained above, in the general mode, the user is capable of installing application software in the projector 10. In other words, during the operation in the general mode, the projector 10 receives an instruction to install new application software in the projector 10 and installs the new application software in the projector 10.

FIG. 6 is a schematic diagram illustrating an initial screen D3 in the hotel mode. When a user, who is a customer, checks in the hotel H and powers on the projector 10 in a guest room allocated to the user, a welcome message, a floor guide, and the like for customers are projected.

The initial screen D3 includes a time indication F31, a language setting interface F32, a welcome message F33, and a function selection interface F34. The time indication F31 and the language setting interface F32 are the same as the time indication F21 and the language setting interface F22 illustrated in FIG. 5. The welcome message F33 is a message welcoming the user to stay at the hotel H.

The function selection interface F34 is an interface for switching a function executed by the projector 10. The selection interface F34 includes a floor guide button F35, an application use button F36, and a television button F37. When the floor guide button F35 is selected, information such as a map of the hotel H, business hours of inhouse facilities, and nearby sightseeing guidance is displayed. When the application use button F36 is selected, the display is shifted to an application software selection screen D4 illustrated in FIG. 7. When the television button F37 is selected, television broadcast is displayed.

Figure 7:
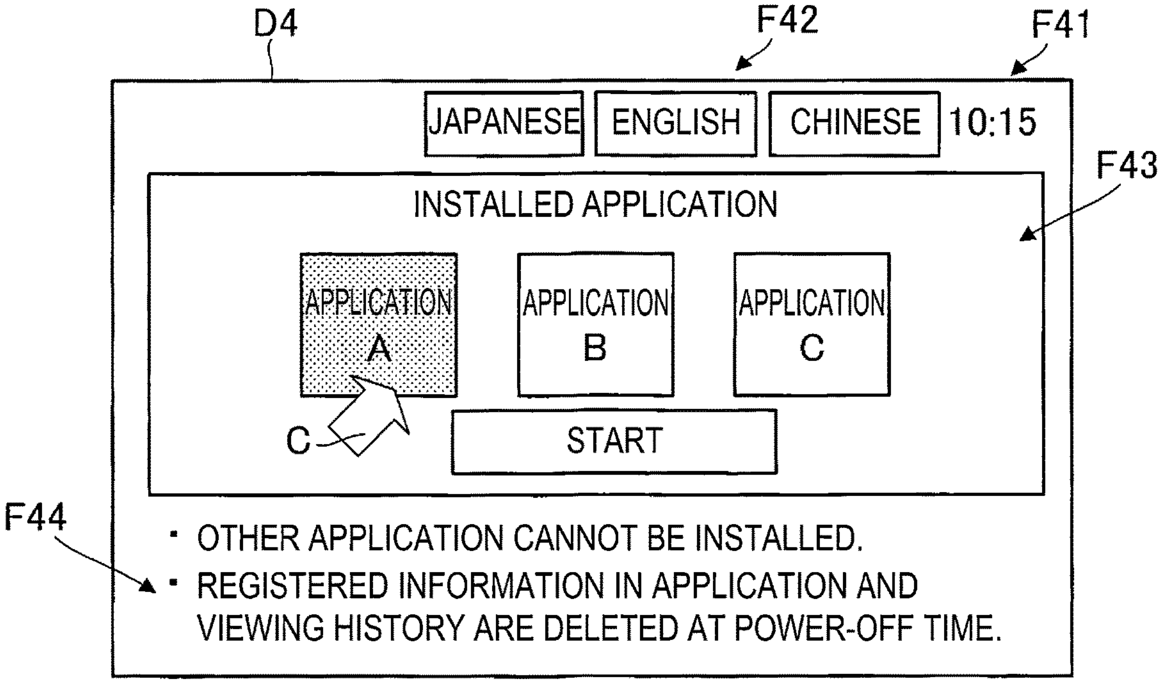
FIG. 7 is a schematic diagram illustrating a selection screen for application software in a hotel mode.

FIG. 7 is a schematic diagram illustrating the application software selection screen D4 in the hotel mode. The selection screen D4 illustrated in FIG. 7 includes a time indication F41, a language setting interface F42, an application software selection interface F43, and a caution message F44. The time indication F41 and the language setting interface F42 are the same as the time indication F21 and the language setting interface F22 illustrated in FIG. 5.

Like the selection interface F23 illustrated in FIG. 5, the application software selection interface F43 is an interface for selecting application software to be executed by the projector 10. In an example illustrated in FIG. 7, the selection interface F43 includes application buttons indicating names of application software installed in the projector 10 and a start button for the application software. The application buttons include an "application A button", an "application B button", and an "application C button". The user moves the cursor C to select a button corresponding to application software desired to be used and thereafter selects the start button. For example, when the user desires to use the application software A, the user selects the "application A button" and then selects the "start button".

Unlike the selection interface F23 illustrated in FIG. 5, the selection interface F43 illustrated in FIG. 7 does not include an initial setting button and an uninstall button. Unlike the selection screen D2 illustrated in FIG. 5, the selection screen D4 illustrated in FIG. 7 does not include the application software addition interface F24. This is because, since an unspecified large number of people use the projector 10 in the hotel mode, inconvenience occurs if the user changes initial setting of application software or installs and uninstalls application software.

The caution message F44 is a message to the user. The caution message F44 illustrated in FIG. 7 indicates that the user cannot install new application software and that registration information and a viewing history input when the application software is used are deleted when the projector 10 is powered off.

Referring back to FIG. 3, the user information processor 173 performs control for correlating user information used by application software with the projector 10 that executes the application software. When the application software is application software for moving image viewing of a moving image distribution service for distributing a moving image via the network N, the user information includes at least one of an account name, a password, and a viewing history of the moving image of the moving image distribution service. Besides, the user information may include age setting, presence or absence of subtitles, language setting, and a favorite genre.

The user information processor 173 correlates the user information and the projector 10 in both of the general mode and the hotel mode. When the user information and the projector 10 are set not to be correlated in the initial setting of the projector 10 or when the user of the projector 10 sets the user information and the projector 10 not to be correlated, the user information processor 173 does not have to correlate the user information and the projector 10.

How the correlation between the user information and the projector 10 is performed varies depending on application software. Examples of the correlation include a method 1 and a method 2 explained below. The method 1 and the method 2 may be simultaneously performed.

Method 1: Stored in the Storage Device 16 of the Projector 10

Information input to the application software A for viewing a moving image of the moving image distribution service A is correlated with identification information of the application software A and is stored as the data 164 in the storage device 16 of the projector 10. When the application software A is used next and subsequent times, the user information processor 173 can save time effort for input by the user by reading the information correlated with the application software A from the storage device 16 and automatically inputting the information. In the method 1, an account name and a password of the user are mainly stored.

Method 2: Stored in a Storage Device of the Moving Image Distribution Server 30B For example, when a fee is set according to the number of terminals capable of viewing moving images in the moving image distribution service B provided by the moving image distribution server 30B, identification information of a terminal used for moving image viewing, that is, identification information of the projector 10 is stored in the moving image distribution server 30B. A viewing history and various settings at the time when a moving image is viewed using the projector 10 are stored in the moving image distribution server 30B in correlation with identification information of the projector 10. The projector 10 transmits user information designated by the application software B and the identification information of the projector 10 to the moving image distribution server 30B.

When a predetermined condition is satisfied, the user information processor 173 performs control to cancel the correlation between the user information and the projector 10. The predetermined condition is, for example, a case in which the projector 10 is powered off in the hotel mode. That is, when the projector 10 is powered off in the hotel mode, the user information processor 173 performs control for cancelling the correlation between the user information and the projector 10. When the projector 10 shifts to the standby state in the hotel mode, the user information processor 173 maintains the correlation between the user information and the projector 10. In other words, the hotel mode includes performing control for cancelling the correlation between the user information and the projector 10 when the projector 10 is powered off and maintaining the correlation between the user information and the projector 10 when the projector 10 shifts to the standby state.

The case in which the projector 10 is powered off in the hotel mode is, for example, a case in which the user checks out from the hotel H. By deleting the user information of the application software at the time of check-out, it is possible to prevent the user information from being known to other guests. For the employee of the hotel H, since the user information is automatically deleted by powering off the projector 10, time and effort for deleting user information of the individual projectors 10 are eliminated and job can be made efficient. The case in which the projector 10 shifts to the standby state in the hotel mode is a case in which the use of the projector 10 is temporarily stopped while the user is out or sleeping. In such a case, time and effort for re-inputting the user information can be saved by maintaining the correlation between the user information and the projector 10.

When the correlation between the user information and the projector 10 is performed by the method 1, the control for cancelling the correlation is, for example, deletion of the user information from the storage device 16. When the correlation between the user information and the projector 10 is performed by the method 2, the control for cancelling the correlation is transmission of a request for deleting the user information correlated with the projector 10 to the moving image distribution server 30B.

When the projector 10 is powered off in the general mode, the user information processor 173 maintains the correlation between the user information and the projector 10. When the projector 10 shifts to the standby state in the general mode, the user information processor 173 maintains the correlation between the user information and the projector 10.

In the general mode, it is not assumed that an unspecified large number of people use the projector 10. Thus, even when the projector 10 is powered off, the user information processor 173 maintains the correlation between the user information and the projector 10. Accordingly, the user can save time and effort to re-input the user information.

In both of the hotel mode and the general mode, when cancellation of the correlation between the user information and the projector 10 is instructed from the user during the use of the projector 10, the user information processor 173 performs control to cancel the correlation between the user information and the projector 10.

A-5. Operation of the Processing Device 17

Subsequently, an operation of the processing device 17 is explained. The following flowchart illustrates a flow of an information processing method executed by the processing device 17 according to the control program 162.

Figure 8:
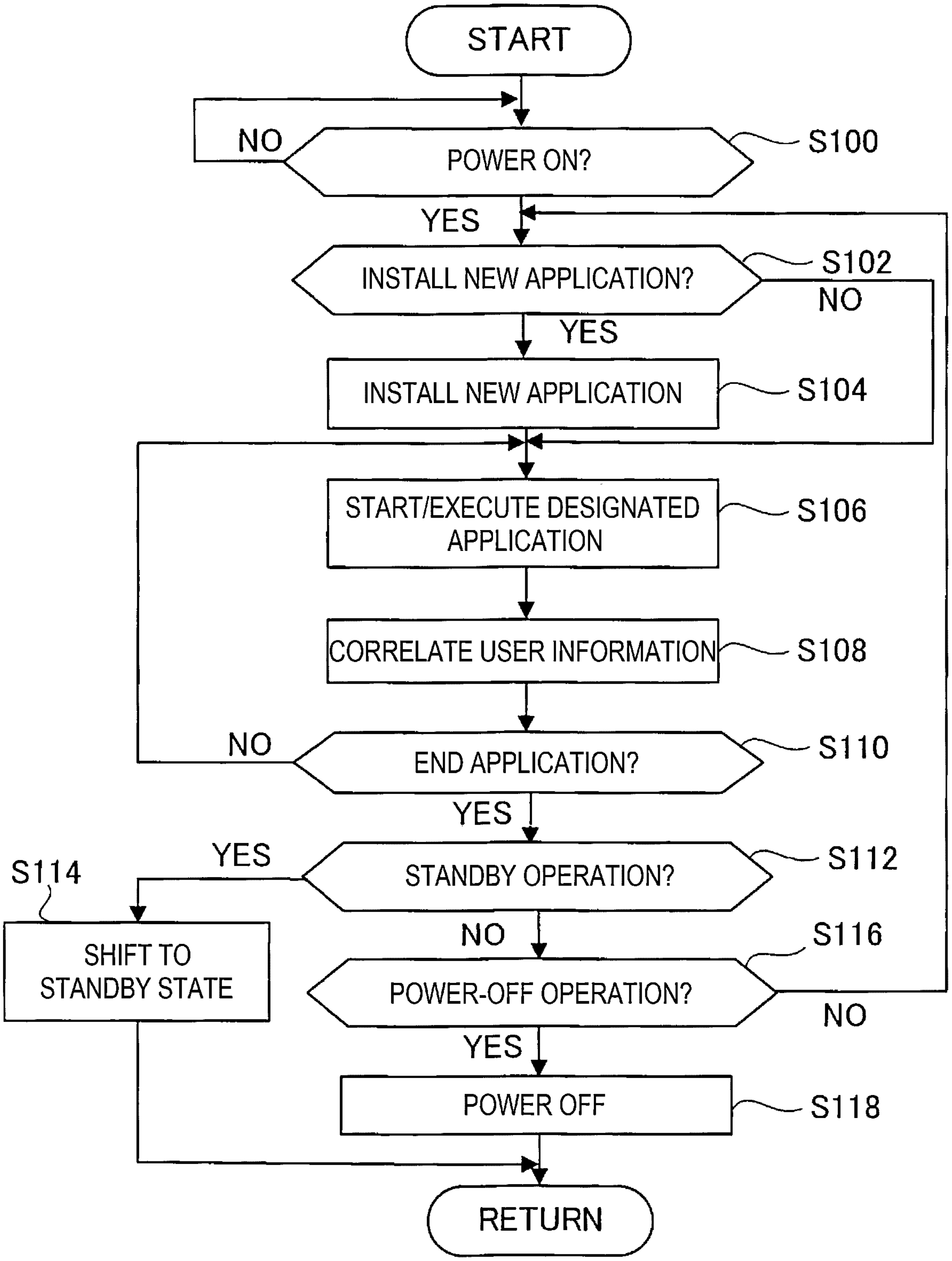
FIG. 8 is a flowchart illustrating a flow of processing in the general mode.

FIG. 8 is a flowchart illustrating a flow of processing in the general mode. The processing device 17 functions as the power supply controller 170 and stays on standby until, for example, the power button of the operation device 12 is operated to power on the processing device 17 (step S100: NO). When being powered on (step S100: YES), the processing device 17 determines whether installation of new application software is instructed (step S102). When installation of new application software is instructed (step S102: YES), the processing device 17 acquires program data of the new application software via the network N, and installs the new application software in the processing device 17 (step S104). When installation of new application software is not instructed (step S102: NO), the processing device 17 advances the processing to step S106.

The processing device 17 functions as the execution unit 172 and starts and executes the application software specified by the user (step S106). The processing device 17 functions as the user information processor 173 and correlates user information input or generated when the application software is executed with the projector 10 (step S108). Until the execution of the application software is ended (step S110: NO), the processing device 17 returns the processing to step S106 and continues the execution of the application software and the correlation between the user information and the projector 10.

When the execution of the application software is ended (step S110: YES), the processing device 17 determines whether operation to instruct a shift to the standby state has been performed (step S112). When the operation to instruct the shift to the standby state has been performed (step S112: YES), the processing device 17 functions as the power supply controller 170 to shift the projector 10 to the standby state (step S114). Thereafter, the processing device 17 returns the processing to step S100. Note that, in step S100 in the standby state, the processing device 17 executes processing corresponding to operation on buttons other than the power button.

When the operation to instruct the shift to the standby state has not been performed (step S112: NO), the processing device 17 determines whether operation to instruct power-off has been performed (step S116). When the operation to instruct power-off has been performed (step S116: YES), the processing device 17 functions as the power supply controller 170 and powers off the projector 10 (step S118). Thereafter, the processing device 17 returns the processing to step S100. When the operation to instruct power-off has not been performed (step S116: NO), the processing device 17 returns the processing to step S102.

As explained above, in the general mode, the correlation between the user information and the projector 10 is not cancelled even when the projector 10 is powered off or is in the standby state. Thus, the user can omit the input of the user information to the projector 10. Convenience of the user is improved.

In the general mode, new application software can be installed. Thus, usage of the projector 10 can be widened, for example, application software for using a service released anew is introduced.

Figure 9:
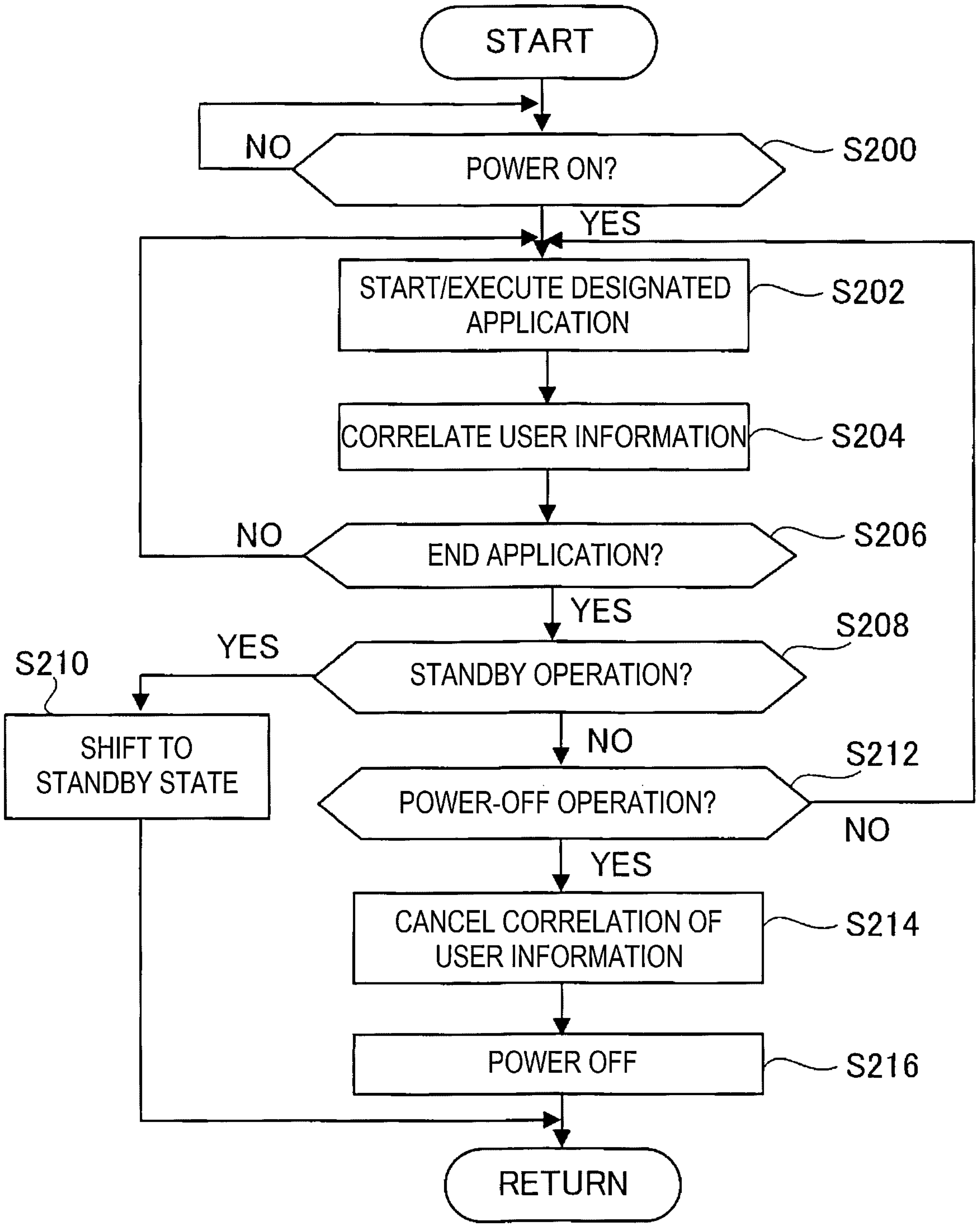
FIG. 9 is a flowchart illustrating a flow of processing in the hotel mode.

FIG. 9 is a flowchart illustrating a flow of processing in the hotel mode. The processing device 17 functions as the power supply controller 170 and stays on standby until, for example, the power button of the operation device 12 is operated to power on the processing device 17 (step S200: NO). When being powered on (step S200: YES), the processing device 17 functions as the execution unit 172 and starts and executes the application software specified by the user (step S202). The processing device 17 functions as the user information processor 173 and correlates user information input or generated when the application software is executed with the projector 10 (step S204). Until the execution of the application software is ended (step S206: NO), the processing device 17 returns the processing to step S202 and continues the execution of the application software and the correlation between the user information and the projector 10.

When the execution of the application software is ended (step S206: YES), the processing device 17 determines whether operation to instruct a shift to the standby state has been performed (step S208). When the operation to instruct the shift to the standby state has been performed (step S208: YES), the processing device 17 functions as the power supply controller 170 to shift the projector 10 to the standby state (step S210). Thereafter, the processing device 17 returns the processing to step S200.

When the operation to instruct the shift to the standby state has not been performed (step S208: NO), the processing device 17 determines whether operation to instruct power-off has been performed (step S212). When the operation to instruct power-off has been performed (step S212: YES), the processing device 17 functions as the user information processor 173 to cancel the correlation between the user information and the projector 10 (step S214). Then, the processing device 17 functions as the power supply controller 170 and powers off the projector 10 (step S216). Thereafter, the processing device 17 returns the processing to step S200. When the operation to instruct power-off has not been performed (step S212: NO), the processing device 17 returns the processing to step S202.

As explained above, in the hotel mode, the correlation between the user information and the projector 10 is maintained when the projector 10 is in the standby state. However, the correlation is cancelled when the projector 10 is powered off. Thus, while the user is staying at the hotel H, input of user information can be omitted by shifting the projector 10 to the standby state without powering off the projector 10. When the user checks out from the hotel H, the correlation between the user information and the projector 10 can be cancelled by powering off the projector 10. Thus, it is possible to reduce a risk of leakage of the user information and save time and effort of the employee of the hotel H.

A-6. Summary of the Embodiment

As explained above, the display device according to the first embodiment correlates user information used by application software with a display device that executes the application software. When the display device is powered off during the operation in the first mode, the display device cancels the correlation between the user information and the display device and maintains the correlation between the user information and the display device when the display device shifts to the standby state.

Accordingly, since the user information and the display device are correlated, when the application software is used a plurality of times, input of the user information can be omitted and control based on the user information can be executed. Convenience of the user is improved. When at the power-off time, since the correlation between the user information and the display device is released, time and effort of the user or a third party is reduced compared with when the user or the third party manually releases the correlation. The third party is, for example, an employee of the hotel H. It is possible to prevent the user information from been seen by others or flowing out to others because the release of the correlation is forgot.

The display device operates in the second mode in which, when the display device is powered off, the correlation between the user information and the display device is maintained and, when the display device shifts to the standby state, the correlation between the user information and the display device is maintained.

Accordingly, even when the display device is powered off, the correlation between the user information and the display device is maintained. Therefore, when the display device is continuously used, convenience of the user is improved.

The display device receives selection of one operation mode among the plurality of operation modes including the first mode and the second mode.

Accordingly, since the first mode and the second mode can be switched, treatment of the user information can be changed according to the user of the display device or a use environment. Convenience of the user is improved.

The display device shifts to the standby state when the first operation is performed on the power button at the power-on time and the display device is powered off when the second operation more complicated than the first operation is performed on the power button.

Accordingly, it is possible to reduce the possibility of powering off the display device because of erroneous operation and prevent the correlation between the user information and the display device from being erroneously released.

When the application software is application software for moving viewing of a moving image distribution service, the user information includes at least one of an account name, a password, and a viewing history of a moving image of the moving image distribution service.

Accordingly, the user can omit input of at least one of the account name and the password at the time of login to the moving image distribution service. Alternatively, the user can determine, based on a viewing history in the moving image distribution service, a moving image to be viewed next and determine, based on the viewing history, a moving image to be displayed by a moving image distribution server as a recommendation.

The display device is capable of installing new application software in the display device during the operation in the second mode.

Accordingly, new application software can be installed in the display device. Convenience of the display device is improved. If new application software cannot be installed in the first mode, it is possible to prevent application software from being installed, without permission, in a display device used by an unspecified large number of users.

B. Second Embodiment

A second embodiment of the present disclosure is explained. In modes exemplified below, concerning elements having the same functions as the function in the first embodiment, the reference numerals and signs used in the explanation of the first embodiment are used and detailed explanation of the elements is omitted as appropriate.

Figure 10:
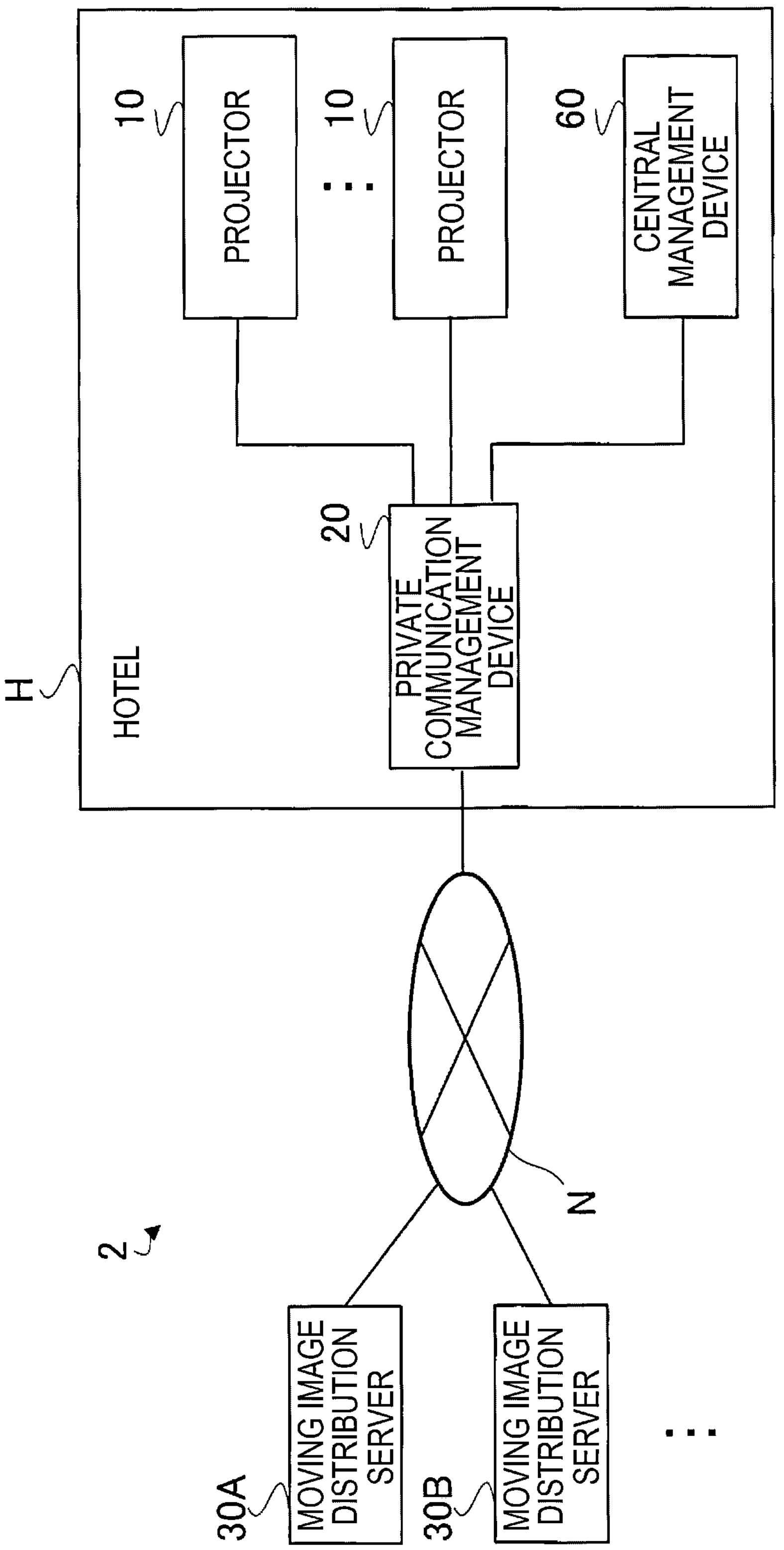
FIG. 10 is a diagram illustrating a display system according to a second embodiment.

FIG. 10 is a diagram illustrating a display system 2 according to the second embodiment. As in the first embodiment, the display system 2 includes the plurality of projectors 10, the private communication management device 20, and the moving image distribution servers 30A and 30B. In the second embodiment, a central management device 60 is installed in the hotel H. It is assumed that the projector 10 is installed in the hotel mode in the hotel H.

The central management device 60 manages various information of the entire hotel H. The various information includes, for example, personal information of customers staying in guest rooms of the hotel H, reservation statuses of the guest rooms, and operation information of equipment in the guest rooms. The central management device 60 is capable of communicating with the projectors 10 installed in the guest rooms via the private communication management device 20.

In the first embodiment, the power on and off of the projector 10 is left to the users who use the guest rooms. On the other hand, it is predicted that a certain number of users forget to power off the projector 10 before check-out. Thus, in the second embodiment, an employee of the hotel H checks power states of the projectors 10 in the guest rooms using the central management device 60 and, when necessary, powers off the projectors 10 by remote control.

Figure 11:
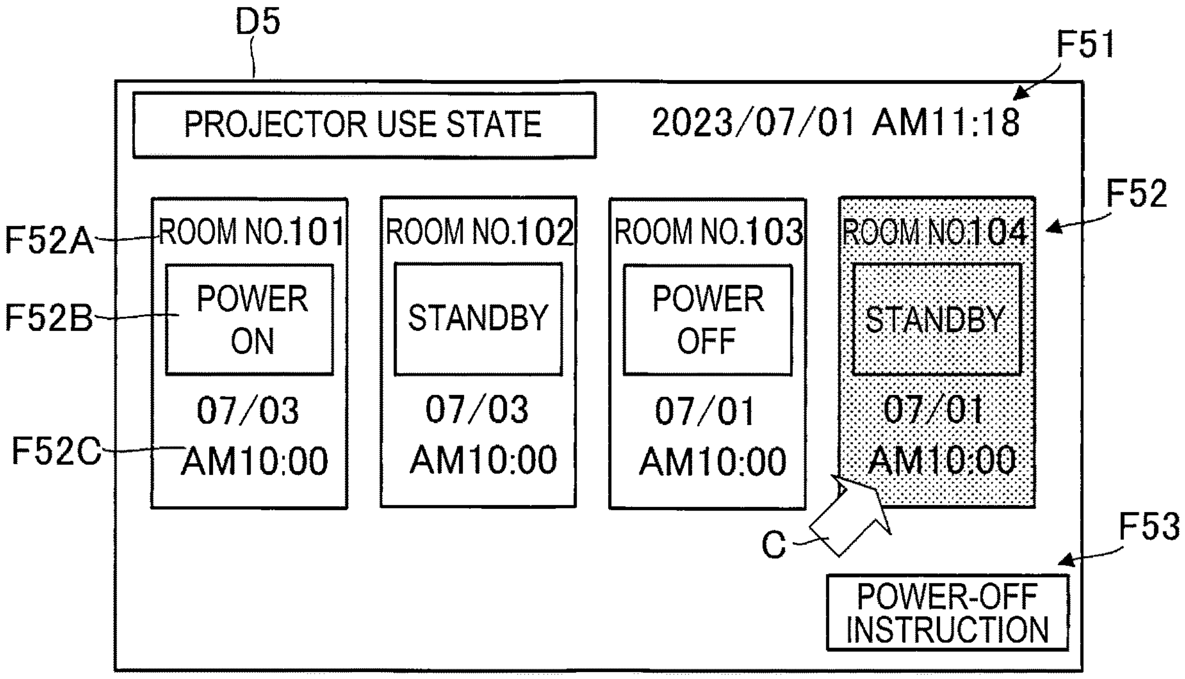
FIG. 11 is a schematic diagram illustrating a display screen of an operation status of the projector.

FIG. 11 is a schematic diagram illustrating a display screen D5 for an operation status of the projector 10. The display screen D5 illustrated in FIG. 5 is displayed on a display of the central management device 60. The display screen D5 includes a time indication F51, an operation status F52, and a power-off instruction button F53.

The time indication F51 indicates current time including a date. The operation status F52 includes a room number F52A, a power supply state F52B, and a scheduled check-out date and time F52C. The room number F52A indicates a number of a guest room in which the projector 10 is installed. In an example illustrated in FIG. 11, the number of the guest room in which the projector 10 is installed is used as identification information for identifying the projector 10. The power supply state F52B is a state of a power supply of the projector 10 and is indicated by any one of "power-on", "standby state", and "power-off". The scheduled check-out date and time F52C is a scheduled check-out date and time determined based on reservation information of the guest room. The power-off instruction button F53 is a button for transmitting a signal for instructing power-off to the projector 10.

An employee of the hotel H checks, based on the operation status F52, whether there is the projector 10 to be powered off. For example, the projector 10 in a room No. 101 is on and the projector 10 in a room No. 102 is in the standby state. Scheduled check-out date and times of guests using these guest rooms are later than the current time, that is, the guests using these guest rooms do not have a problem in the state of the projector 10 because the guests are in stay periods. Although a scheduled check-out date and time of a room No. 103 has already elapsed, there is no problem because the projector 10 is off.

On the other hand, although a scheduled check-out date and time of a room No. 104 has already elapsed, the projector 10 is in the standby state. In this case, it is predicted that a guest in the room No. 104 checked out without powering off the projector 10. In order to cancel the correlation between the user information and the projector 10, it is necessary to power off the projector 10. The employee moves the cursor C up to display of the operation status F52 of the room No. 104 to select the display. Thereafter, when the employee moves the cursor C to the power-off instruction button F53 and selects the power-off instruction button F53, a signal for instructing power-off is transmitted from the central management device 60 to the projector 10 in the room No. 104.

When the processing device 17 of the projector 10 in the room No. 104 receives the signal instructing power-off, the processing device 17 functions as the user information processor 173 to cancel the correlation of the user information. The processing device 17 functions as the power supply controller 170 and powers off the projector 10. In other words, the projector 10 in the room No. 104 receives a signal for powering off the projector 10 from the central management device 60 coupled to the projector 10 via a network. The network in this case is a local area network in the hotel H. The projector 10 in the room No. 104 powers off the projector 10 based on the signal. The central management device 60 is an example of an information processing device.

Rather than the employee checking the statuses of the projectors 10 in the guest rooms as explained above, the central management device 60 may automatically transmit a signal for powering off the projector 10. In this case, the central management device 60 extracts a guest room in which the scheduled checkout date and time F52C is before the current time, that is, a guest room in which the scheduled check-out date and time F52C has elapsed and determines whether a power supply state of the projector 10 in the guest room is "power-off". When there is a guest room that is not "power-off", the central management device 60 transmits a signal for powering off the projector 10 to the projector 10 in the guest room. In other words, the signal for powering off the power supply of the projector 10 may be transmitted based on information indicating a period in which the projector 10 is used. The period in which the projector 10 is used is a period in which the user has a right of using the guest room in which the projector 10 is installed. An end of the period is indicated by, for example, the scheduled checkout date and time F52C.

As described above, the display device according to the second embodiment powers off the display device based on the signal for powering off the display device transmitted from the information processing device coupled to the display device via the network.

Accordingly, the display device can be powered off from the information processing device coupled to the display device via the network. Thus, the correlation between the user information and the display device can be released from a place separated from the display device. Convenience of the user or the third party is improved.

The signal for powering off the display device is transmitted based on information indicating a period in which the display device is used.

Accordingly, for example, the correlation between the user information and the display device can be released at appropriate timing such as releasing the correlation between the user information and the display device after the end of the period in which the display device is used.

C. Modifications

The embodiments exemplified above can be variously modified. Specific configurations of modifications applicable to the above described embodiments will be exemplified below. Two or more configurations optionally selected from the following exemplifications can be combined as appropriate as long as the configurations are mutually consistent.

C-1. Modification 1

In the embodiments explained above, it is assumed that the display device is the projector 10. Not only this, but the display device may be a computer coupled to a display, a portable information processing device including a display, a smart television, or the like. The display may be, for example, a flat panel display (FPD). The FPD is, for example, a liquid crystal display, a plasma display, or an organic electro-luminescence (EL) display. The display is an example of an optical device.

C-2. Modification 2

In the embodiments explained above, when the projector 10 is powered off in the hotel mode, the correlation between the user information and the projector 10 is cancelled and, when the projector 10 shifts to the standby state, the correlation between the user information and the projector 10 is maintained. In the general mode, the correlation between the user information and the projector 10 is maintained in both of the case in which the projector 10 is powered off and the case in which the projector 10 shifts to the standby state.

Not only this, but, for example, the projector 10 may have an operation mode in which the correlation between the user information and the projector 10 is cancelled in both of the case in which the projector 10 is powered off and the case in which the projector 10 shifts to the standby state. For example, the projector 10 may have an operation mode in which, when the projector 10 is powered off, the correlation between the user information and the projector 10 is maintained and, when the projector 10 is switched to the standby state, the correlation between the user information and the projector 10 is cancelled.

C-3. Modification 3

In the embodiments explained above, the projector 10 executes the application software. Not only this, but, for example, an information processing device connectable to the projector 10 may execute the application software. The information processing device may be a memory stick-shaped information processing device not including a display and including a connector connectable to the projector 10. In this case, the projector 10 and the memory stick-shaped information processing device function as a display device.

C-4. Modification 4

In the embodiment explained above, the application software A and the application software B are installed in the projector 10 and the moving image distribution service is provided. Not only this, but other application software using user information such as an account service, a game, and a communication sales may be installed in the projector 10 and may be controlled by a plurality of modes including the general mode and the hotel mode.

D: Summary of the Present Disclosure

A summary of the present disclosure is appended below.

Appendix 1

An information processing method including: performing control for correlating user information used by application software with a display device that executes the application software; and operating in a first mode including: performing control for cancelling the correlation between the user information and the display device when the display device is powered off; and maintaining the correlation between the user information and the display device when the display device shifts to a standby state.

Accordingly, since the user information and the display device are correlated, when the application software is used a plurality of times, input of the user information can be omitted and control based on the user information can be executed. Convenience of the user is improved. When at the power-off time, since the correlation between the user information and the display device is released, time and effort of the user or a third party is reduced compared with when the user or the third party manually releases the correlation. It is possible to prevent the user information from been seen by others or flowing out to others because the release of the correlation is forgot.

Appendix 2

The information processing method according to the appendix 1, further including operating in a second mode including: maintaining the correlation between the user information and the display device when the display device is powered off; and maintaining the correlation between the user information and the display device when the display device shifts to the standby state.

Accordingly, even when the display device is powered off, the correlation between the user information and the display device is maintained. Therefore, when the display device is continuously used, convenience of the user is improved.

Appendix 3

The information processing method according to the appendix 2, further including receiving selection of one operation mode among a plurality of operation modes including the first mode and the second mode.

Accordingly, since the first mode and the second mode can be switched, treatment of the user information can be changed according to the user of the display device or a use environment. Convenience of the user is improved.

Appendix 4

The information processing method according to any one of the appendixes 1 to 3, further including: receiving a signal for powering off the display device from an information processing device coupled to the display device via a network; and powering off the display device based on the signal.

Accordingly, the display device can be powered off from the information processing device coupled to the display device via the network. Thus, the correlation between the user information and the display device can be released from a place separated from the display device. Convenience of the user or the third party is improved.

Appendix 5

The information processing method according to the appendix 4, wherein the signal is transmitted based on information indicating a period in which the display device is used.

Accordingly, for example, the correlation between the user information and the display device can be released at appropriate timing such as releasing the correlation between the user information and the display device after the end of the period in which the display device is used.

Appendix 6

The information processing method according to any one of the appendixes 1 to 3, further including:

the display device shifting to the standby state when first operation is performed on a power button of the display device at a power-on time of the display device; and powering off the display device when second operation more complicated than the first operation is performed on the power button.

Accordingly, it t is possible to reduce the possibility of powering off the display device because of erroneous operation and prevent the correlation between the user information and the display device from being erroneously released.

Appendix 7

The information processing method according to any one of the appendixes 1 to 3, wherein the application software is application software for moving image viewing of a moving image distribution service for distributing a moving image via a network, and the user information includes at least one of an account name, a password, and a viewing history of the moving image of the moving image distribution service.

Accordingly, the user can omit input of at least one of the account name and the password at the time of login to the moving image distribution service. Alternatively, the user can determine, based on a viewing history in the moving image distribution service, a moving image to be viewed next and determine, based on the viewing history, a moving image to be displayed by a moving image distribution server as a recommendation.

Appendix 8

The information processing method according to the appendix 2 or 3, further including: receiving an instruction to install new application software in the display device during an operation in the second mode; and installing the new application software in the display device.

Consequently, in the second mode, it is possible to install new application software in the display device. Convenience of the display device is improved. If new application software cannot be installed in the first mode, it is possible to prevent application software from being installed, without permission, in a display device used by an unspecified large number of users.

Appendix 9

A display device including an optical device and a processing device, the processing device executing: executing application software; performing control for correlating user information used by the application software with the display device; and operating in a first mode including: performing control for cancelling the correlation between the user information and the display device when the display device is powered off; and maintaining the correlation between the user information and the display device when the display device shifts to a standby state.

Appendix 10

A recording medium storing a program, the program causing a processing device to execute: performing control for correlating user information used by application software with a display device that executes the application software; and operating in a first mode including: performing control for cancelling the correlation between the user information and the display device when the display device is powered off; and maintaining the correlation between the user information and the display device when the display device shifts to a standby state.

What is claimed is:

1. An information processing method comprising:

performing control for correlating user information used by application software with a display device that executes the application software;

operating in a first mode including performing control for cancelling correlation between the user information and the display device when the display device is powered off; and maintaining the correlation between the user information and the display device when the display device shifts to a standby state; and operating in a second mode including:

maintaining the correlation between the user information and the display device when the display device is powered off; and maintaining the correlation between the user information and the display device when the display device shifts to the standby state.

2. The information processing method according to claim 1, further comprising receiving selection of one operation mode among a plurality of operation modes including the first mode and the second mode.

3. The information processing method according to claim 1, further comprising:

receiving a signal for powering off the display device from an information processing device coupled to the display device via a network; and powering off the display device based on the signal.

4. The information processing method according to claim 3, wherein the signal is transmitted based on information indicating a period in which the display device is used.

5. The information processing method according to claim 1, further comprising:

the display device shifting to the standby state when first operation is performed on a power button of the display device while the display device is powered on; and powering off the display device when second operation more complicated than the first operation is performed on the power button.

6. The information processing method according to claim 1, wherein the application software is application software for moving image viewing of a moving image distribution service for distributing a moving image via a network, and the user information includes at least one of an account name, a password, and a viewing history of the moving image of the moving image distribution service.

7. The information processing method according to claim 1, further comprising:

receiving an instruction to install new application software in the display device during the second mode; and installing the new application software in the display device.

8. A display device comprising:

an optical device; and a processing device, the processing device programmed to execute executing application software;

performing control for correlating user information used by the application software with the display device; and operating in a first mode including performing control for cancelling correlation between the user information and the display device when the display device is powered off, and maintaining the correlation between the user information and the display device when the display device shifts to a standby state; and operating in a second mode including:

maintaining the correlation between the user information and the display device when the display device is powered off; and maintaining the correlation between the user information and the display device when the display device shifts to the standby state.

9. A non-transitory recording medium storing a program, the program causing a processing device to execute:

performing control for correlating user information used by application software with a display device that executes the application software; and operating in a first mode including performing control for cancelling correlation between the user information and the display device when the display device is powered off, and maintaining the correlation between the user information and the display device when the display device shifts to a standby state; and operating in a second mode including:

maintaining the correlation between the user information and the display device when the display device is powered off; and maintaining the correlation between the user information and the display device when the display device shifts to the standby state.

* * * * *